(12) United States Patent
Marti et al.

(10) Patent No.: US 8,937,592 B2
(45) Date of Patent: Jan. 20, 2015

(54) RENDITION OF 3D CONTENT ON A HANDHELD DEVICE

(75) Inventors: Stefan Marti, Santa Clara, CA (US); Seung Wook Kim, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 858 days.

(21) Appl. No.: 12/784,231

(22) Filed: May 20, 2010

(65) Prior Publication Data
US 2011/0285622 A1    Nov. 24, 2011

(51) Int. Cl.
G06F 3/033    (2013.01)
G06T 15/20    (2011.01)

(52) U.S. Cl.
CPC .............. G06T 15/20 (2013.01); *G06T 2215/16* (2013.01)
USPC ......................................................... 345/158

(58) Field of Classification Search
CPC .......... G06F 3/005; G06F 3/012; G06F 3/013
USPC ................... 345/156–184; 340/944, 988–996; 701/400, 408–541
See application file for complete search history.

(56) References Cited

U.S. PATENT DOCUMENTS

| | | | |
|---|---|---|---|
| 7,202,869 B2 * | 4/2007 | Tooley et al. | 345/473 |
| 7,321,342 B2 * | 1/2008 | Nagae | 345/2.1 |
| 2003/0012408 A1 * | 1/2003 | Bouguet et al. | 382/103 |
| 2003/0098832 A1 * | 5/2003 | Fraser et al. | 345/87 |
| 2006/0074549 A1 * | 4/2006 | Takahashi et al. | 701/207 |
| 2007/0070060 A1 * | 3/2007 | Kagawa et al. | 345/418 |
| 2009/0313584 A1 | 12/2009 | Kerr et al. | |
| 2010/0045666 A1 * | 2/2010 | Kornmann et al. | 345/419 |
| 2010/0064259 A1 * | 3/2010 | Alexanderovitc et al. | 715/852 |
| 2010/0079371 A1 * | 4/2010 | Kawakami et al. | 345/156 |
| 2010/0156907 A1 * | 6/2010 | VanderSpek et al. | 345/427 |

OTHER PUBLICATIONS

Carita "Face Detection and Tracking on the Nokia N900 (Video)" http://conversations.nokia.com/2010/03/05/face-detection-and-tracking-on-the-nokia-n900/, Mar. 5, 2010, pp. 1-5.
"Apple Patent Sees You Computing Hands-Free in 3D", Gizmodo, http://gizmodo.com/542642/apple-patent-sees-you-computing-hands+free-in-3d, 2 pages, 2009.

* cited by examiner

*Primary Examiner* — Stephen Sherman
(74) *Attorney, Agent, or Firm* — Kenneth L. Sherman, Esq.; Michael Zarrabian, Esq.; Sherman & Zarrabian LLP

(57) ABSTRACT

A handheld device having a display and a front-facing sensor and a back-facing sensor is able to render 3D content in a realistic and spatially correct manner using position-dependent rendering and view-dependent rendering. In one scenario, the 3D content is only computer-generated content and the display on the device is a typical, non-transparent (opaque) display. The position-dependent rendering is performed using either the back-facing sensor or a front-facing sensor having a wide-angle lens. In another scenario, the 3D content is composed of computer-generated 3D content and images of physical objects and the display is either a transparent or semi-transparent display where physical objects behind the device show through the display. In this case, position-dependent rendering is performed using a back-facing sensor that is actuated (capable of physical panning and tilting) or is wide-angle, thereby enabling virtual panning.

35 Claims, 9 Drawing Sheets

RENDITION OF 3D CONTENT ON A HANDHELD DEVICE

BACKGROUND OF THE INVENTION

1. Field of the Invention

The present invention relates generally to handheld computing devices and methods of displaying 3D content. More specifically, the invention relates to a handheld computing device and techniques for displaying 3D content and mixed reality content in a realistic, spatially correct manner.

2. Description of the Related Art

The amount of three-dimensional content available on the Internet and from other sources, such as video games, medical imaging, and movies, is rapidly increasing. Consumers are becoming more accustomed to hearing about "3D" in various contexts, such as movies, TV, games, and online virtual environments. However, mobile or handheld devices have so far not adapted to enabling users to view and interact with 3D content in a realistic way.

Current handheld devices have displays that are capable of rendering 3D content, however, they do not take into consideration two important factors. One factor is the device's location and orientation (relative to the physical environment around it). Another factor is the user's location and orientation (relative to the device). Because handheld devices currently do not consider these two factors, problems arise when displaying spatial 3D content, for example, a virtual house in a virtual environment or visual information overlay of an augmented reality system. In one scenario a user expects 3D content to be stationary on the display but instead it appears to be moving from the user's perspective. It should be stationary on the display relative to the physical environment when the user is stationary and is only moving the handheld device. In this case, the spatial content should not appear to be moving. In another scenario, the spatial content is stationary when the user expects it to move. This occurs when the handheld device is stationary and the user moves (e.g., shifts head left to right). In this case, the user expects the spatial content to move on the screen because the angle at which the user is viewing it is changing. However, with current handheld devices, the 3D content does not move. In both these instances, the rendering of the spatial content is not realistic or natural and there is a breakdown in the interaction.

It is desirable to make the visual experience of the 3D content on a 2D display more realistic and immersive. Currently, handheld devices may take into account view-dependent rendering (VDR) only, which assumes that the device is stationary and that only the user's head moves in reference to the display. Other handheld devices may take into account position-dependent rendering (PDR) only, which assumes that the user's head and device move synchronously (i.e., are "locked") and also assumes that the device (or, specifically, the display) is on-axis (on-center) of the user's view. Neither of these features (PDR or VDR) alone provides for a realistic and spatially correct rendering of 3D content or of 3D content and physical image composites.

SUMMARY OF THE INVENTION

One aspect of the invention is a method of rendering 3D computer-generated content on a handheld device such that the rendering is spatially correct and creates a realistic visual interaction with the user. The user's face is tracked using a front-facing (i.e., user-facing) imager on the device. In one embodiment, this imager may be a 2D camera, a 3D camera, or any other suitable imager or sensor. This tracking creates user-tracking data. The position of the device may also be determined, creating device-position data. This position determination may result from using a back-facing camera on the device (i.e., a camera facing away from the user) that provides, for example, optic flow data relating to movement of the device.

In another embodiment, the user-facing camera may be used to obtain device position data. In this scenario, the user-facing camera may be a wide-angle lens camera which can be used to track the user and to simultaneously track background regions immediately adjacent to the user, which can be used to determine the position of the device. A set of rendering data related to the 3D content is then calculated using the user-tracking data and the device-position data. In one embodiment, this may be done by taking the sum (adding) the two sets of data, for example, using vector addition. The rendering data may then be used to display the 3D content on the handheld device. In this manner, both view-dependent rendering (VDR) from the user-tracking data and position-dependent rendering (PDR) from determining the device's position, are combined to render the 3D content on the display. Thus, when the user moves while keeping the device stationary, a 3D object on the display does not appear to move relative to the physical environment, which is the desired, realistic rendering. Conversely, if the user is stationary and the handheld device is moved, the 3D object appears to move on the display (yet stationary in reference to the physical environment) which is the desired, realistic rendering. Both these factors are taken into account when the handheld device and the user move at the same time to create a spatially correct rendering of the 3D content.

Another aspect of the invention is another method of rendering 3D computer-generated content on a handheld device having a user side and a back or rear side, such that the rendering is spatially correct and creates a realistic visual interaction with the user. In this embodiment, however, the 3D content is composed of computer-generated content (typical 3D content) and one or more images of physical objects in front of the back or rear side of the handheld device. In most scenarios, the computer-generated 3D content is composited onto the images of the physical (real) objects. In the aspect of the invention described above, the content displayed was only computer-generated 3D content. The user's face may be tracked using a front-facing (i.e., user-facing) imager on the device. This tracking creates user-tracking data. The position of the device may also be determined, creating device-position data. This position determination may result from using the back-facing camera on the device (i.e., a camera facing away from the user) that provides, for example, optic flow data relating to movement of the device.

A set of rendering data related to the 3D content and to the physical objects is then calculated using the user-tracking data and the device-position data. In one embodiment, this may be done by taking the sum (adding) the two sets of data, for example, using vector addition. The rendering data may then be used to display the 3D content and the images of the physical objects on the handheld device. In this manner, both view-dependent rendering (VDR) from the user-tracking data and position-dependent rendering (PDR) from determining the device's position are combined to render the content on the display. Thus, when the user moves while keeping the device stationary, an object on the display does not appear to move in reference to the physical environment which is the desired, realistic rendering. Conversely, if the user is stationary and the handheld device is moved, the object appears to move on the display (yet stationary in reference to the physical environment), which is the desired, realistic rendering.

Both these factors are taken into account when the handheld device and the user move at the same time to create a spatially correct rendering of the content, that is, the composite of the computer-generated 3D content and images of the physical objects.

In one embodiment, the position of the handheld device may be determined using an imager on the back side of the device to track a position of a physical (real) object relative to the device. In another embodiment, the device has an opaque display and the imager enables display of the image of the physical object on the opaque display. The imager on the device may be a camera capable of mechanical panning and tilting, that is, an actuated camera. In another embodiment, the imager may be a wide-angle lens camera having a maximum field of view and a sub-field of view within the maximum field. The physical object is within the sub-field of view of the wide-angle lens camera. In another embodiment, the device has a partially or fully transparent display type where the image of the physical object is displayed on the handheld device and is done without the use of an imager on the back side of the device.

One aspect of the invention is a handheld device. The device has a display, a CPU, a network interface, and a data storage component. A sensor facing the user on the device, such as a camera, tracks the user's face and creates face-tracking data. Another sensor, on the opposite side of the device, tracks movement of the device itself and creates device-tracking data. A summation module combines or adds the face-tracking data and the device-tracking data. A rendering module calculates rendering data using the face-tracking data and the device-tracking data. These data are stored in the data storage component. An image of a 3D object, such as virtual world content, is displayed on the device in a spatially correct manner and presents a realistic visual experience when viewing the 3D object on the device.

In one embodiment, the handheld device has a virtual camera calculation module for calculating a position of a virtual camera within the device, creating virtual camera position data. This virtual camera position data may be used to calculate the rendering data. In one embodiment, one of the sensors is an actuated camera capable of mechanical panning and tilting. In another embodiment, the rendering module may use the virtual camera position data and physical object images to calculate the rendering data. In another embodiment, the display is a partially transparent display such that a user can optically see through the display and see physical objects.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for rendering 3D content and images of physical objects and background scenery images on a handheld computing device are described in the various figures. View-dependent rendering (VDR) may be used for adjusting display of the content to when the user's head is moving relative to the display. Position-dependent rendering (PDR) may be used for adjusting the display of content to when the monitor or display is moving relative to the physical, real world environment. These two concepts are used concurrently or are combined to calculate rendering data for displaying 3D content on a display of a handheld device in a realistic and spatially correct way. That is, that the 3D objects, and any images of physical objects and background scenery ("physical objects") either remain stationary or move as would be expected by a user when the user moves the device, moves relative to the device, or, as would be in most cases, does both. This concept is illustrated in FIGS. 1A and 1B.

Figure 1A:
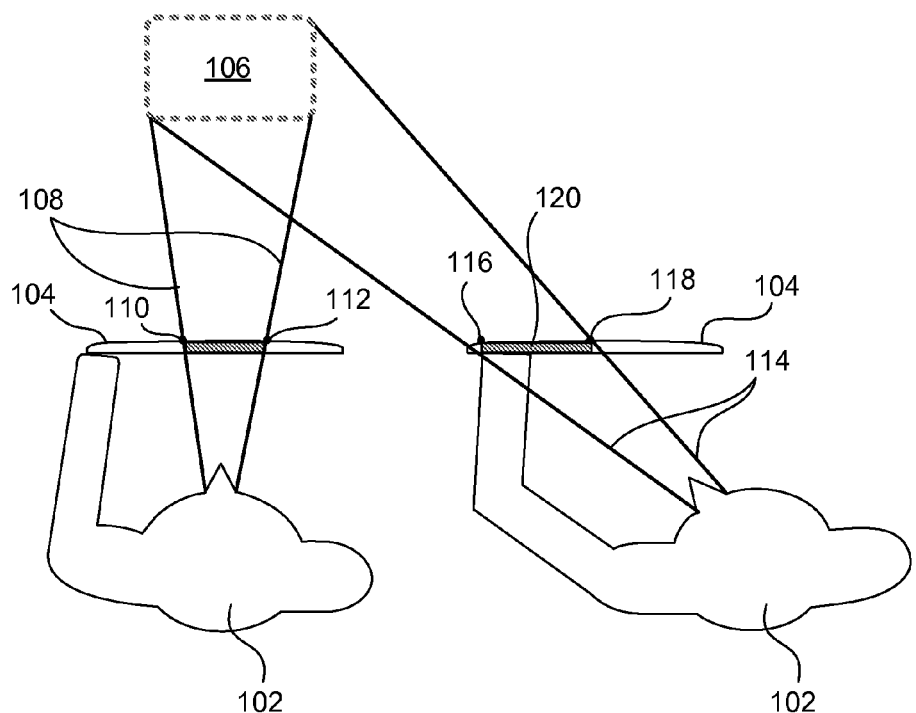
FIGS. 1A and 1B are top views of a user holding a handheld device having a display viewing a 3D object.

FIG. 1A is a top view of a user 102 holding a handheld device having a display 104 viewing a 3D object. In the illustration on the left, user 102 is viewing a computer-generated 3D object, represented in virtual space by dashed box 106. The user's perspective or line of view is shown by lines 108. The portion of display 104 on which the 3D object is displayed is indicated by points 110 and 112, having a width w, and represented by the shaded portion of display 104. In the illustration on the right of FIG. 1A, user 102 has moved (as indicated by the extended left arm) but display 104 and the 3D object displayed on it has essentially remained stationary. The user's line of view has changed shown by lines 114. Now, the portion of display 104 that displays the object has increased somewhat and has shifted to the left of display 104, indicated by points 116 and 118, because user 102 has moved to the right. User 102 is now viewing the object at an angle and thus the object looks slightly larger on display 104, as indicated by the larger shaded portion 120 of display 104. If, from the user's perspective, box 106 did not appear to move on display 104, it would strike the user as unrealistic and the user's interaction with the 3D object would be diminished.

Figure 1B:
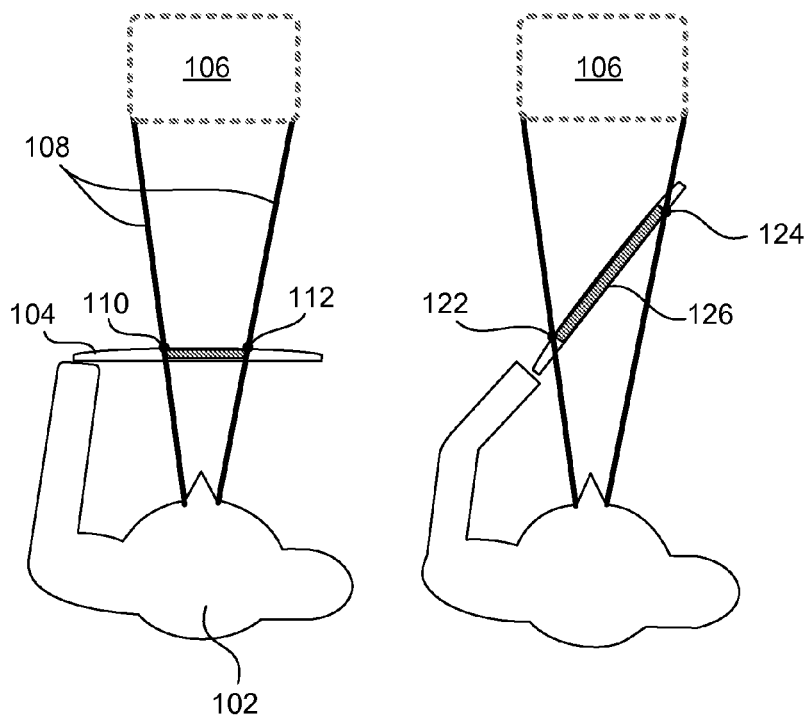

FIG. 1B is a similar top view of a user holding a device viewing a 3D object. Here user 102 is holding the device and viewing 3D object 106 on display 104 (the same as the illustration on the left of FIG. 1A). The portion of display 104 that displays object 106 is indicated by points 110 and 112 and has width w. However, user 102 on the right of FIG. 1B remains stationary but has moved display 104. The line of view of user 102 has not changed (shown by lines 108 as before). But, because display 104 has moved, more specifically, is now at an angle relative to user 102, it appears to be smaller (essentially having less surface area) from the user's perspective. The portion on display 104 that now shows object 106 is indicated by points 122 and 124. Here, the virtual window has changed but object 106 has not. To user 102, it does not appear that object 106 has moved, its image has simply occupied a larger portion of display 104, as indicated by the shaded portion 126, because display 104 has moved and now has less surface area from the user's perspective. If object 106 looks like it had moved when user 102 moved display 104 as shown in FIG. 1B, it would have appeared unrealistic; user 102 would expect object 106 to remain stationary. As a practical matter, in typical usage, user 102 and display 104 are likely to move simultaneously. Embodiments of the present invention enable rendering of 3D object 106 to be realistic and spatially correct to user 102 under such conditions.

Virtual World/Virtual Reality Embodiment

Figure 2A:
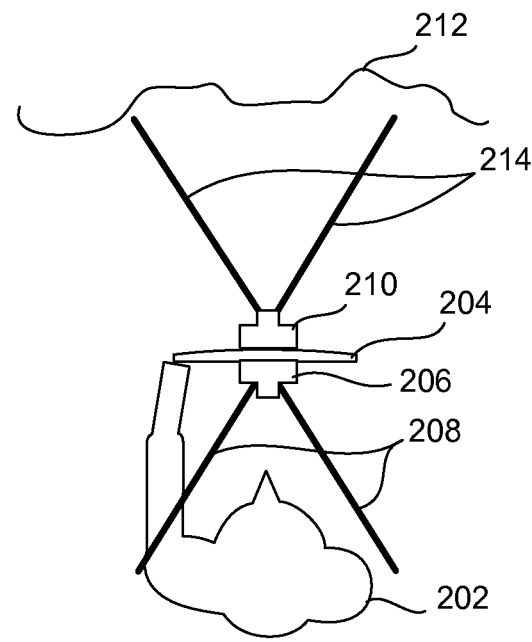
FIG. 2A is a diagram showing a top view of a user holding a handheld device having two imagers in accordance with one embodiment.

FIG. 2A is a diagram showing a top view of a user holding a handheld device having two imagers in accordance with one embodiment. A user 202 is holding a device 204 having a user-facing imager 206 with a field of view shown by lines 208 that is capable of tracking movement of the user's face while holding device 204. Such face-tracking software for imagers is commercially available. Data from imager 206 is used for view-dependent rendering (VDR). A back-facing imager 210 captures images of physical objects and/or background scenery 212 on the other side of device 204 as shown by lines 214. As described below, back-facing imager 210 is used for measuring optical flow of device 204 which is used for PDR. In this embodiment, both imagers 206 and 210 may be described as having normal or standard field of views, that is, they are not wide-angle lens or other special types of imagers. An imager will typically be a 2D camera, but may be a 3D camera or other sensor capable of capturing images.

Figure 2B:
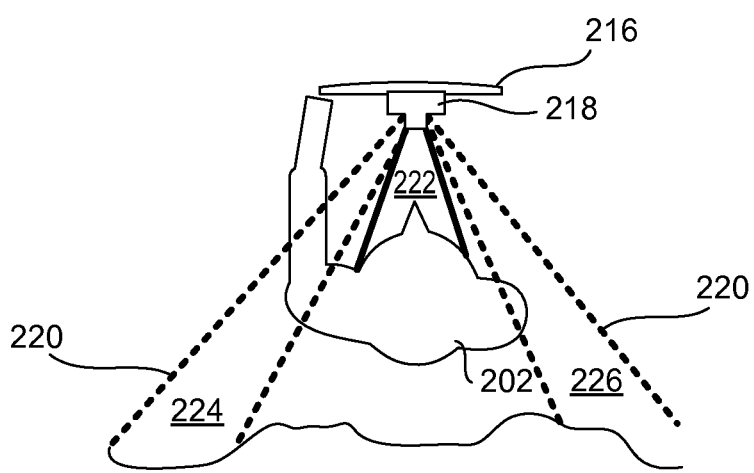
FIG. 2B is a top view diagram of a user holding a device having one imager facing the user.

FIG. 2B is a similar top view diagram of user 202 holding a device 216 having one imager 218 facing the user. In this embodiment, imager 218 has a wider field of view (i.e., it is a wide-angle lens camera) as shown by outer dashed lines 220. This wider range can be divided into sub-portions. One portion or section 222, shown by the solid lines, tracks the user's face and is used for VDR.

Techniques known in the field of vision processing can be used to detect a body or face and eliminate it from the surrounding background areas. Using this technique, overall optic flow can be detected. Overall optic flow makes reference to a pattern of apparent motion of objects, surfaces, and edges in a visual scene caused by relative motion between an observer (an eye or imager, such as a camera) and the scene or object. Measuring overall optic flow in two dimensions (e.g., left-right, up-down) is generally computationally feasible. Areas 224 and 226 adjacent to user 202 may be used to measure optical flow in background regions around user 202. This data is used to compute PDR of device 218. Tracking these areas is possible because of the use of wide-angle imager 218 and its ability to detect differences in objects being tracked within its field of view or range (shown by outer lines 220). It should be noted that device 218 may also have a back-facing imager or other sensors, however, they are not needed to determine PDR. The advantage of this embodiment is that device 218 only needs one imager for rendering 3D content spatially correct on a mobile handheld device.

Figure 3:
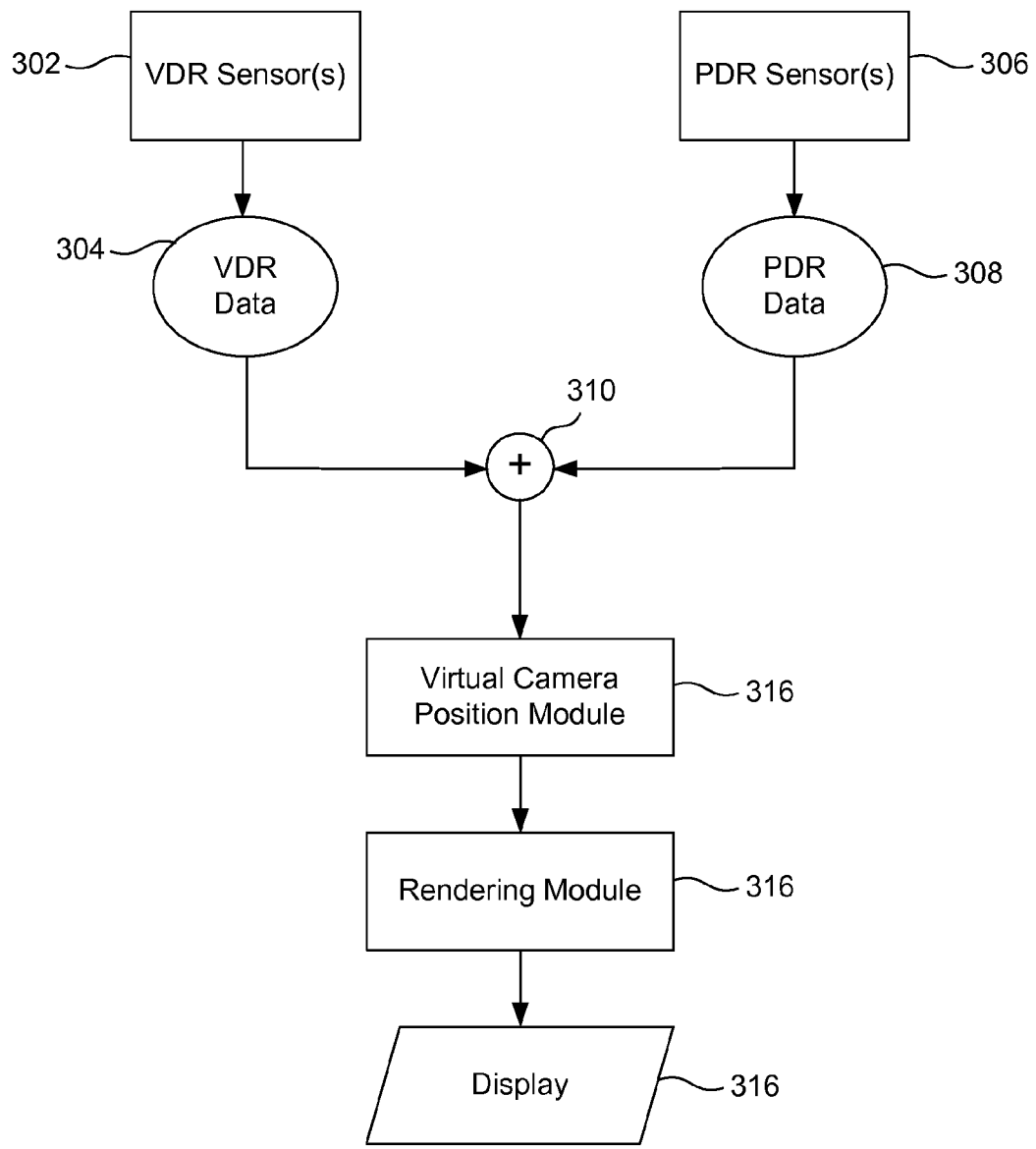
FIG. 3 is a block diagram of components and data in a handheld computing device in accordance with one embodiment.

FIG. 3 is a block diagram of components and data in a handheld computing device, such as device 204 or 216, in accordance with one embodiment. As described above, there are two types of tracking data that are collected: VDR data and PDR data. VDR sensors 302, such as imager 206 in FIG. 2A or imager 218 in FIG. 2B, collect data on user face movements. They may be imagers, such as 2D cameras, depth cameras, or other suitable sensors (such as thermal sensors, acoustic sensors, radar and laser sensors, and so on) capable of tracking a user's face. These sensors 302 create VDR data 304. In one specific example, this data 304 may be in the form of geometrical coordinates, (i.e., x, y, and z) and may represent two to six degrees of freedom (DOF). In this example or implementation, two DOFs may represent only the x and y position of the user's face in front of the display. Six DOFs may measure x, y, and z coordinates of a face as well as the full orientation of the face in reference to the device. Various other implementations are possible and the format or properties of VDR data 304 may vary. PDR sensors 306, such as imager 210 or imager 218, collect data on optic flow of physical objects or background scenery around the device, such as areas 224 and 226, or the space between lines 214, in order to detect the movements of the device. This collected data, PDR data 308 (and the PDR data described in the other embodiments) represents a "pose estimation" of the device and may be composed of orientation data only (yaw-pitch-roll) or DOF in reference to the external environment (physical world), as described below.

VDR data 304 and PDR data 308 are then added or combined by summation module 310. The output of module 310 is input to a "virtual camera" position calculation module 312. This module calculates the position of the virtual camera into the virtual or 3D environment that the user sees through the display of the handheld device, that is, it provides a user perspective into a 3D world. Generally, the virtual camera is able to render any perspective of the computer-generated 3D content for the user. A rendering module 314 takes the virtual camera position data and calculates the actual rendering data used to display the 3D content on a display 316 of the device. The rendered content may be 3D (computer-generated or modeled based on a 3D scan of a physical object) or it may be 2D (more typical, conventional content at the time of the invention). In either case, however, the content is rendered in a 3D or virtual environment. This enables motion parallax to be used to increase the spatial immersive experience for the user.

Figure 4:
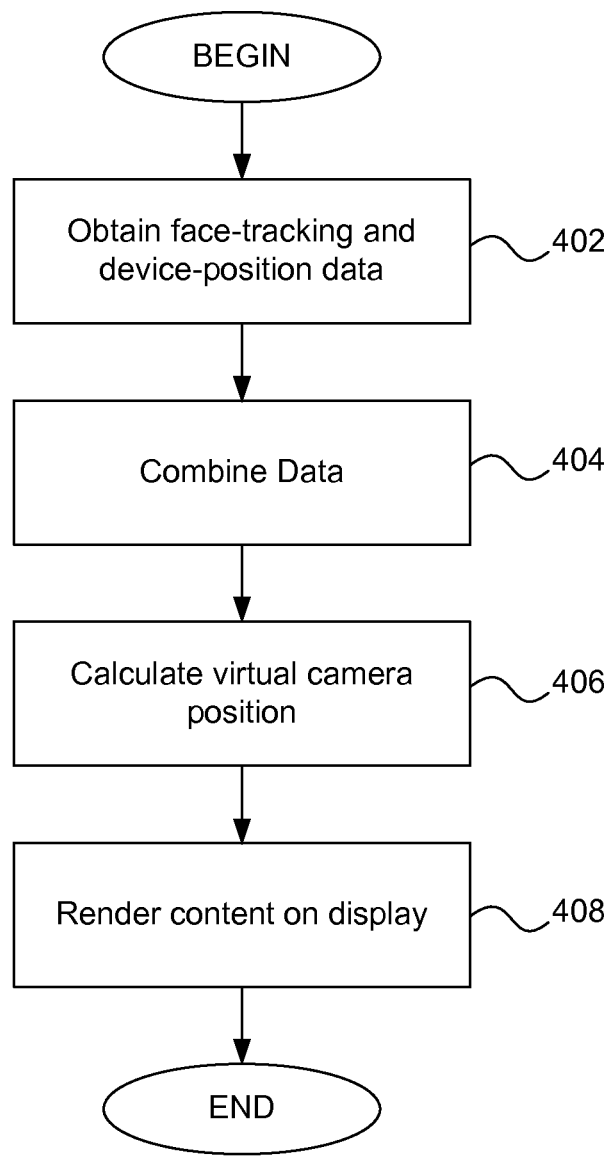
FIG. 4 is a flow diagram of a process of providing a spatially correct rendering of 3D content on a handheld device in accordance with one embodiment.

FIG. 4 is a flow diagram of a process of providing a spatially correct rendering of 3D content on a handheld device in accordance with one embodiment. At step 402 an imager on the device, such as a camera, collects face-tracking data. In one embodiment, this data may provide lengths measured in metric units and angles may be measured in degrees. Imager software may detect a user face as being 1.24 m away from the imager (z-axis), 0.34 m to the left of the imager (x-axis), and 0.21 m up (y-axis), all relative to the center of the imager. It may also provide that the orientation of the detected face towards the display is at 4 degrees yaw, 9 degrees pitch, and 0 degrees roll. In other embodiments, depending on the imager and associated software, this data may have different characteristics.

At step 403, device position data is collected from an imager or other type of sensor, such as an inertial sensor. There are different ways for a handheld device to sense its own position, and the units of the measurements depend on the particular method or manner used. For example, if the device uses gravity sensors and a compass to detect its movement, then angles towards the physical environment (real world) will be in the same unit (i.e., degrees) as the angular data for VDR, namely, yaw, pitch, and roll, described above. The geometrical coordinates of the device's movement (x, y, and z) with respect to PDR may not necessarily correspond directly to the geometrical coordinates of VDR. In one embodiment, a macro-level or larger scale solution may be to use a global positioning satellite (GPS) solution, which may also be able to output metric units (as in the VDR output above) to describe a position "delta" from an origin. In another embodiment, a micro level or local scale solution, with the goal of outputting measurements in centimeters, a solution involving optical flow combined with scene distance estimates may be used. In this embodiment, the handheld device essentially tracks the movements of "pixel groups" between images taken consecutively. The distance of these pixels from the imager would also be able to output movement and position data in metric units (e.g., centimeters). In this manner, the output of the VDR and the PDR are in the same units.

In other embodiments, for both PDR and VDR, the geometric coordinate position may be measured at a micro level in other ways. For example, one way may be to use an imager, such as sensor 210, 206 or 218, that looks at visual features and tracks them (a process also referred to as markerless feature tracking). Another way may be to use a 3D (depth) camera that looks at 3D features and performs simultaneous localization and mapping (SLAM), a technique used by robots and autonomous vehicles to build a map in an unknown environment while simultaneously keeping track of their current location. These may output different geometric coordinate (XYZ) data.

At step 404, the user-tracking (i.e., VDR) data 304 is combined or added with the position-tracking (PDR) data 308. For example, this may be done using vector addition of the two sets of data (each composed of location and orientation data). At step 406 the combined VDR and PDR data is used to calculate a virtual camera position and orientation of the handheld device. This calculates the user's perspective of a virtual object as seen through the device's monitor into the 3D environment. At step 408 the 3D content is rendered on the device's display using as input the virtual camera position which, in turn, uses the user's viewing (face) position and the position of the device. The 3D content is displayed in a manner that adjusts to the user's movements and the movement of the device, and thereby is spatially correct and creates an immersive user experience.

Augmented Reality/Mixed Reality

In the context described in FIGS. 2A, 2B, 3 and 4, all the 3D content and what the user sees on the display is computer-generated. That is, on the display the user sees only a virtual world or objects in a virtual reality. The orientation and location of the virtual camera of the display is dynamically adjusted. However, various embodiments of the present invention may also be applied in a different context, referred to as an augmented reality or mixed reality ("AR/MR") context. In this context, at least some of the images seen on the display are not computer-generated. They are images of physical (real world) objects that have a specific location in the physical world and which can be seen or that "pass through" from behind the device. This may be done using a back-facing camera to portray images of these real world objects. Or, it may be done by using a special display and without the use of a camera. In AR/MR, the computer-generated 3D content (or 2D content) may be composited "on top" of images of real world objects that are shown on the display (i.e., non-computer-generated content). It is this compositing that leads to use of the term "augmented" or "mixed" reality, in that real objects are augmented or mixed with computer-generated content and then displayed. In one embodiment, of AR/MR, the back-facing imager or visual sensor may be capable of either actual mechanical panning or virtual panning/tilting (or both).

Figure 5A:
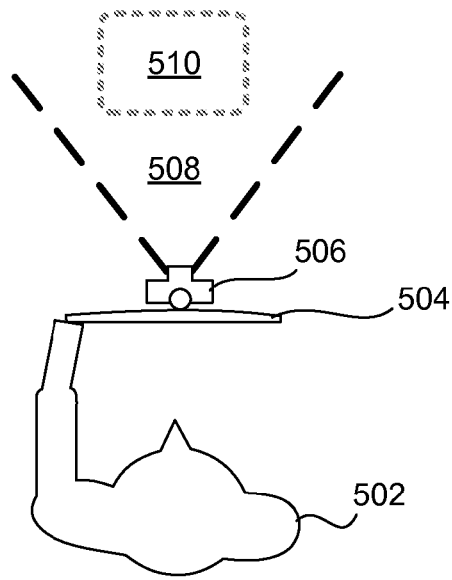
FIGS. 5A and 5B are diagrams showing a top-view of a user holding a device having back-facing imager.

FIG. 5A is a diagram showing a top-view of a user 502 holding a device 504 having back-facing imager 506. User 502 is viewing a display (not shown in FIG. 5A) of device 504. Imager 506 has a field of view 508 shown by the dashed lines. Dashed box 510 represents a real world object (e.g., a top-view of a table). In this diagram, imager 506 is pointed straight at box 510 and is parallel with device 504. In one embodiment, imager 506 uses object 510 to determine optical flow of device.

Figure 5B:
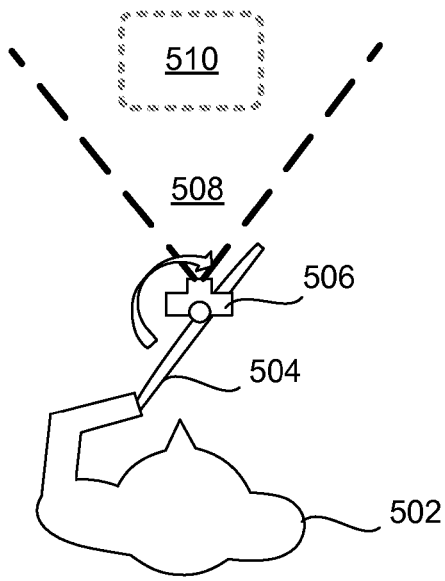

In FIG. 5B, user 502 turns (moves) device 504 to the left as shown. User 502 does not move her gaze. Imager 506 stays focused on object 510, which has not moved, and its field of view 508 remains in the same place. When device 504 is turned, imager 506 mechanically pans to the right so that its focus is still on object 510. In one embodiment, imager 506 may also be capable of mechanically tilting up or down if user 502 turns device 502 upward or downward. Imager 506 can mechanically pan to the left or right or tilt up or down in order to show physical object 510 on the display of device 506. Here it is assumed that user 502 wants to keep the image of object 510 on the display even though he is moving device 504. Movement of device 504 affects how the computer-generated 3D content is rendered on the display in a way that seems realistic to user 502.

Figure 6A:
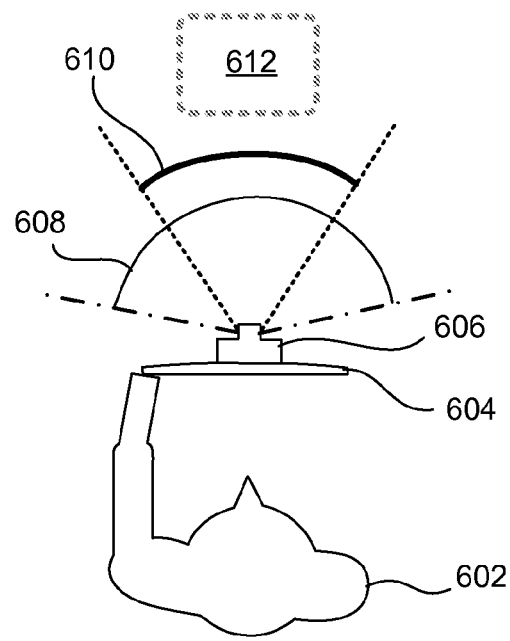
FIGS. 6A and 6B are diagrams showing a top view of a user holding a device in accordance with another embodiment.
Figure 6B:
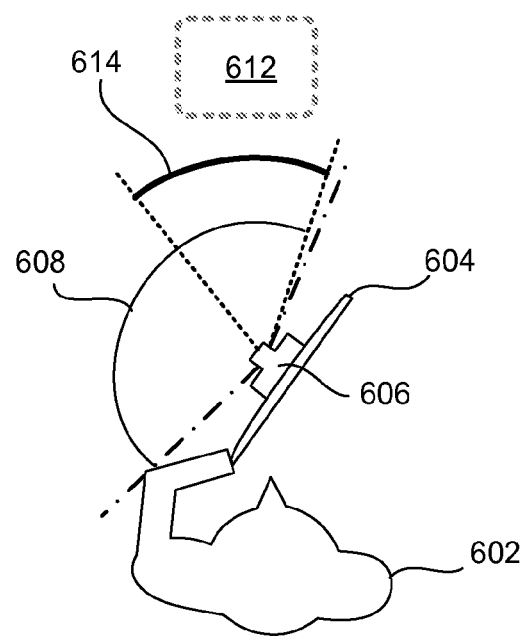

FIG. 6A is a diagram showing a top view of a user 602 holding a device 604 in accordance with another embodiment. In this embodiment, device 604 has an imager 606 that does not actuate or mechanically pan or tilt. It has a field of view 608 shown by the lines that is wider than a normal or conventional FOV. As noted above, imager 606 may be referred to as having a wide-angle lens. A sub-view 610 of imager 606 captures physical object 612 and displays it on device 604. FIG. 6B is a similar top-view diagram of user 602 holding device 604 having imager 606. Here, as in FIG. 5B, user 602 turns device 604 to the left. However, because of wide field of view 608, physical object 612 remains within a sub-field of view 614. This sub-field of view 614 is different from sub-field of view 610 in that it occupies a different portion of view 608. User 602 still sees object 612 on the display, but, as in FIG. 5B, the rendering of computer-generated 3D objects on the display will change based on the position of device 604 and the user face position.

For ease of illustration, FIGS. 5A and 5B and in FIGS. 6A and 6B do not show user-facing imagers. These imagers are present on devices 504 and 604 and are the same or have similar features as imagers 206 and 218. They are used for collecting VDR data by tracking user 502 or 602.

Figure 7:
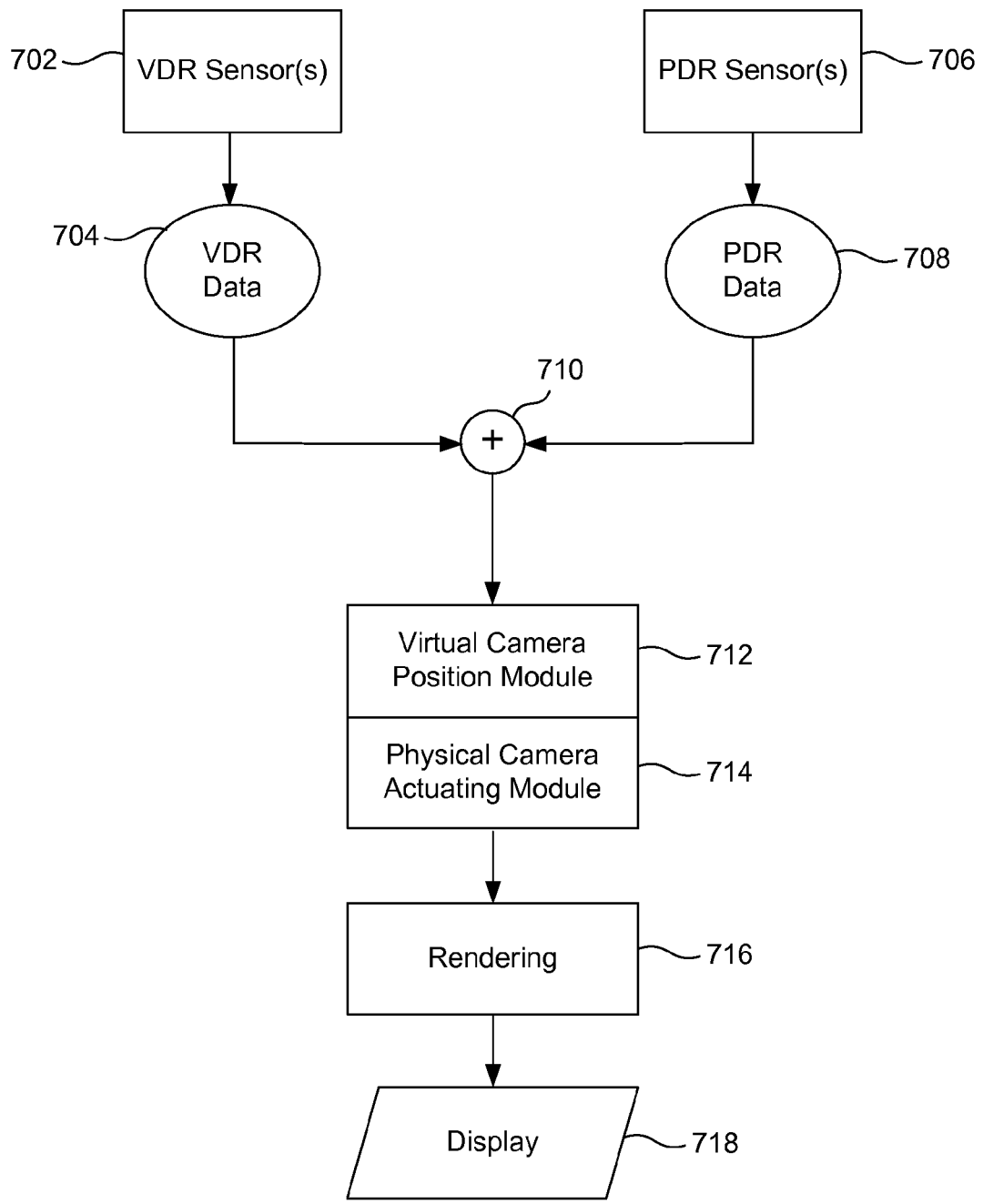
FIG. 7 is a block diagram of a handheld device in accordance with one embodiment.

FIG. 7 is a block diagram of a device, such as device 604 or 504, in accordance with one embodiment. VDR sensors 702 gather VDR data 704 from tracking the user. As with the virtual world embodiment, VDR sensors 702 may be an imager or other sensor. They may have a normal or standard field of view or may have a wide-angle lens that captures the user and surrounding background scenery. In either case, VDR sensors 702 provide user-tracking data used for VDR. PDR sensor 706 may be an imager that is able to mechanically pan and tilt, such as imager 506, or be an imager that has a wide-angle lens used to perform virtual panning. PDR sensors 706 collect PDR data 708. This data and VDR data 704 are similar to or same as VDR data 304 and PDR data 308. They are combined by component 710, where the combination may be a vector addition of the two data sets. The primary difference from the first embodiment is that the back-facing imager for collecting PDR data 708 may pan, either mechanically or virtually, in order to keep an image of physical object 510 or 612 on the device display.

At module 712, a virtual camera position is calculated. This is similar to calculations made by module 312 in FIG. 3. The virtual camera position needs to be calculated to show the user a perspective of the virtual content. This module calculates the position of the virtual camera into the virtual or 3D environment that the user sees through the display of the handheld device, that is, it provides a user perspective into a 3D world. The virtual camera position addresses the virtual 3D content.

However, in one embodiment, images of physical objects are displayed by a physical imager module 714. As noted, if the imager is an actuated camera, it is mechanically moved to capture an image of the physical object within its field of view. In another embodiment, the imager has a wide-angle lens. In this case, the imager may change its sub-field of view within its maximum field of view, thereby effectively performing a virtual pan. In either mechanical or virtual case, the panning is performed to ensure that, within the physical limitations of the imager (i.e., its maximum actuation angle or maximum angle of the lens that the physical (real world) object is included on the display. This rendering of a physical object which is location specific, on the display using a back-facing camera may be referred to as a "video see-through" embodiment. In this setting, the device has a standard display that is opaque (i.e., not transparent to any degree). The physical objects or background images can be easily processed (thereby avoiding any occlusion issues between the computer-generated 3D objects and the physical objects, before the physical object images are composited with the 3D objects). However, with the video see-through setting, special camera types are needed, as described above. In addition, images of the physical objects or background images from the camera need to be processed (e.g., horizontally and/or vertically compressed or stretched, compensating for an off-axis display rendering of the physical objects behind the device). In either case, the device still calculates a virtual camera position because virtual content (computer-generated 3D objects) are also displayed on the device and the virtual camera position needs to be calculated for this content.

A rendering module 716 accepts as input the virtual camera position data and images of the physical objects from the imager hardware. It then calculates the actual rendering data used to display the 3D content and the physical objects on a display 718 of the device.

In another embodiment, an "optical see-through" setting is used to display the physical object on the device. In this embodiment, unlike the video see-through setting, an image is not shown, but rather the actual object is seen. In this setting, the device has a partially or variably transparent display (a display that can render color per pixel or make a pixel transparent), as is known in the art of displays. Another type of display may use a transparent plate and micro projection onto the plate to achieve a transparent-like display. The transparent plate requires a surface that reflects the light from the micro projection, but is otherwise mostly optically transparent. If the device has one of these types of displays, the physical object is seen on the device by virtue of the user optically seeing through the actual display, instead of using a camera to capture an image and displaying it, which is in the video see-through setting. In the optical see-through setting, the device does not need a back-facing camera. However, there are cases of occlusion between the physical object and the computer-generated 3D content that require a particular display technology which allows dark pixels being able to occlude a bright physical object behind the display.

Figure 8:
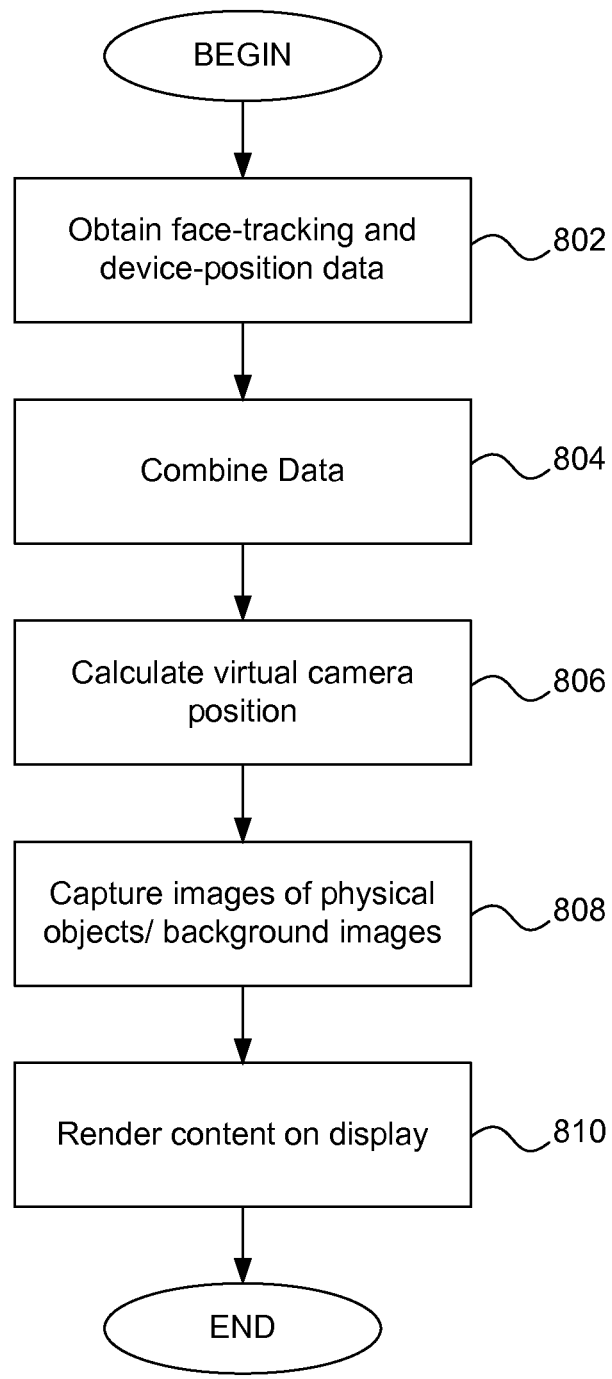
FIG. 8 is a flow diagram of a process of rendering augmented reality/mixed reality in a spatially correct on a handheld device in accordance with one embodiment.

FIG. 8 is a flow diagram of a process of rendering AR/MR, that is, the 3D content and composited images of objects, in a spatially correct manner on a handheld device in accordance with one embodiment. The first three steps 802, 804, and 806 are similar to steps 402, 404, and 406 of FIG. 4 describing the virtual world embodiment. At step 802 a user-facing imager on the device collects face-tracking data. As described above, this data may be measured in metric units and angles may be measured in degrees. In one specific example, the VDR data may be in the form of geometrical coordinates, (i.e., x, y, and z) and may represent two to six degrees of freedom (DOF). Two DOFs may represent only the x and y position of the user's face in front of the display. Six DOFs may measure x, y, and z coordinates of a face as well as the full orientation of the face in reference to the device. In other scenarios, there may be a "roll" angle effect from either the user's head tilting while viewing and holding the device stationary or from rotating the transparent display while the user holds still. If the user holds a transparent display device in a stable position and, while viewing content on the display, tilts her head, the 3D content on the display should not rotate with respect to the display. This is because the 3D content being displayed is expected to maintain or "stick" with the orientation of the background, which is the content (physical objects) seen through the transparent display. If the 3D content on the transparent display did rotate as the user tilted her head, it would appear unrealistic to the user, that is, the AR/MR content would not be displayed in a spatially correct manner. In another scenario, the user holds her head still and rotates or rolls the transparent display device, for example, turning it to the right or left. In this case, the 3D content on the transparent display is expected to rotate with respect to the display. As in the first case, the 3D content on the display should "stick" with the orientation of the background. Various other implementations are possible and the format or properties of the VDR data may vary.

At step 803, device position data is also collected from an imager or other type of sensor, such as an inertial sensor, gravitational sensor, or magnetic sensor. There are different ways for a handheld device to sense its own position for PDR, and the units of the measurements depend on the particular method or manner used. As with the previous embodiment, if the device uses gravity sensors and a compass to detect its movement, then angles towards the physical environment (real world) will be in the same unit (i.e., degrees) as the angular data for VDR, namely, yaw, pitch, and roll, described above. The geometrical coordinates of the device's movement (x, y, and z) with respect to PDR may not necessarily correspond as directly to the geometrical coordinates of VDR. In one embodiment, a macro level or larger scale solution may be to use a global positioning satellite (GPS) solution, which may also be able to output metric units (as in the VDR output above) to describe a position. In another embodiment, a micro level or local scale solution, with the goal of outputting measurements in centimeters, a solution involving optical flow combined with scene distance estimates may be used. In this manner, the output of the VDR and the PDR are in the same units.

In other embodiments, for both PDR and VDR, the geometric coordinate position may be measured on a micro level in other ways. For example, one way may be to use a back-facing imager, such as sensor 506 or 606, or a user-facing imager, that looks at visual features and tracks them (markerless feature tracking). Another way may be to use a 3D (depth) camera that looks at 3D features and performs SLAM, as noted earlier. These may output different geometric coordinate (XYZ) data.

At step 804, user-tracking (i.e., VDR) data 704 is combined or added with the position-tracking data or PDR data 708. For example, this may be done using vector addition of the two sets of data (each composed of location and orientation data). At step 806 the combined VDR and PDR data is used to calculate a virtual camera position and orientation of the handheld device. This calculates the user's perspective as seen through the device's monitor into the 3D environment.

At step 808, in the video see-through embodiment or setting, images of physical objects or background images are captured by the back-facing imager. As described in detail above, the imager may actuate as needed to capture the images or may virtually pan using a sub FOV (of the maximum FOV) to ensure that the physical object image is captured. These images, together with the content shown in the given virtual camera position, are rendered on the display at step 810. In the optical see-through embodiment, the user sees the physical objects by directly looking through the display. The rendering may require that the 3D content be composited or overlaid on top of the physical objects seen through the display or on physical object images. There may be a visual information overlay (the computer-generated 3D content or 2D content) of an augmented reality system. In either case, the rendering takes into account the movements of the user eye gaze and position and the movement of the device.

Figure 9A:
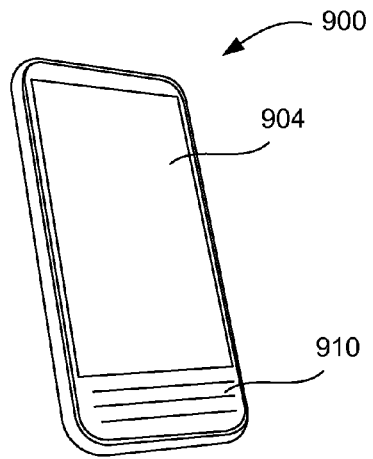
FIGS. 9A and 9B show one physical implementation of the computing system of a handheld device.
Figure 9B:
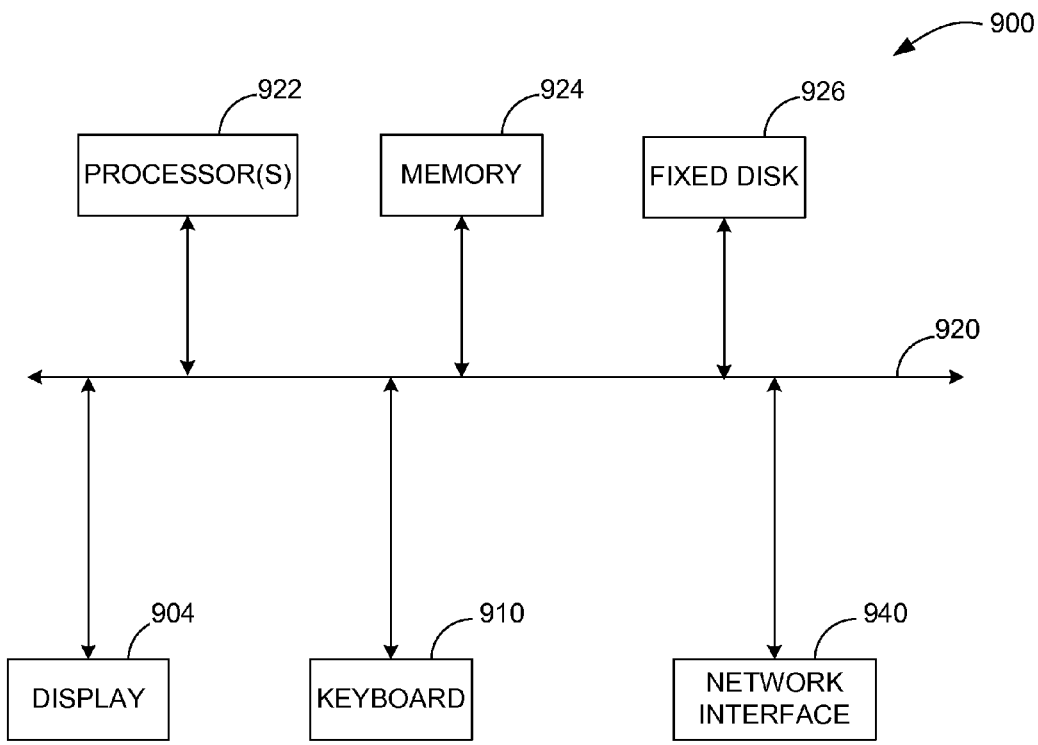

As noted above, the handheld device may have various implementations, for example, as a smart phone or cell phone, a tablet computer, a netbook computer, an Ultra-Mobile PC (UMPC), a Mobile Internet Device (MID) or any other device that can be held by the user (typically using the user's hands) that can be moved in front of the user and are suitable for viewing media content. FIGS. 9A and 9B illustrate a handheld computing system 900 suitable for implementing specific embodiments of the present invention. FIG. 9A shows one possible physical implementation of a computing system, specifically a cell phone. In one embodiment, system 900 includes a display 904. It may also have a keyboard 910 that is shown on display 904 or may be a physical component that is part of the device housing. It may have various ports such as HDMI or USB ports (not shown). Computer-readable media that may be coupled to device 900 may include USB memory devices and various types of memory chips, sticks, and cards.

FIG. 9B is an example of a block diagram for computing system 900. Attached to system bus 920 is a variety of subsystems. Processor(s) 922 are coupled to storage devices including memory 924. Memory 924 may include random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to processor 922; it provides additional data storage capacity and may also include any of the computer-readable media described below. Fixed disk 926 may be used to store programs, data and the like and is typically a secondary storage medium that is slower than primary storage. It will be appreciated that the information retained within fixed disk 926, may, in appropriate cases, be incorporated in standard fashion as virtual memory in memory 924.

Processor 922 is also coupled to a variety of input/output devices such as display 904 and network interface 940. In general, an input/output device may be any of: video displays, keyboards, microphones, touch-sensitive displays, tablets, styluses, voice or handwriting recognizers, biometrics readers, or other devices. Processor 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon processor 922 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of rendering computer-generated content on a handheld device, comprising:
    creating user-tracking data by tracking user face information, wherein the user-tracking data comprises information relating a position and an orientation of a user face relative to the handheld device;
    creating device-position data by determining a position of the handheld device, wherein the device-position data comprises information relating to an orientation of the handheld device relative to a physical environment the handheld device is situated;
    calculating rendering data using the user-tracking data and the device-position data; and
    displaying the computer-generated content on the handheld device according to the rendering data, wherein rendering of the computer-generated content is adjusted based on user movement relative to the handheld device and handheld device movement relative to the physical environment the handheld device is situated.

2. The method as recited in claim 1 wherein tracking user face information comprises:
    using a first sensor, wherein the first sensor is an imager.

3. The method as recited in claim 2 wherein determining a position of the handheld device comprises:
    using a second sensor, wherein the second sensor is one of an inertial sensor and a gravitation sensor.

4. The method as recited in claim 1 further comprising:
    utilizing a single sensor to track the user face information and to determine the position of the handheld device relative to the physical environment.

5. The method as recited in claim 4 wherein the single sensor is a wide-angle camera that faces the user and simultaneously tracks the user face information and areas surrounding the user.

6. The method as recited in claim 1 wherein the user-tracking data ranges from two degrees of freedom (DOF) to six DOF.

7. The method as recited in claim 1 wherein:
the device-position data includes position data and orientation data indicating yaw, pitch, and roll of the handheld device relative to the physical environment the handheld device is situated.

8. The method as recited in claim 7, further comprising:
determining optic flow data related to the physical environment the handheld device is situated, wherein the orientation data and the position data are derived from the optic flow data.

9. The method as recited in claim 1 wherein content on the handheld device appears stationary from a user line of view when the user line of view is stationary and the handheld device is moved in different directions.

10. The method as recited in claim 1 wherein content on the handheld device appears to change from a user line of view when the handheld device is moved in different directions.

11. The method as recited in claim 1 further comprising:
adjusting a virtual camera position using the rendering data, wherein the rendering data is used in a direct mapping of user-tracking data and device-position data to the virtual camera position.

12. The method of claim 11, wherein the user-tracking data and device-position data are used for generating the virtual camera position, and for determining user perspective of a virtual object viewed through a display of the handheld device into a 3D environment.

13. The method of claim 1, wherein the content displayed comprises computer-generated virtual objects and real objects.

14. The method of claim 1, wherein rendering of the computer-generated content combines view-dependent rendering (VDR) and position-dependent rendering (PDR).

15. The method of claim 14, wherein VDR is used for adjusting display of content on a display of the handheld device based on user head movement relative to the display, and PDR is used for adjusting the display of content when the display is moving relative to the physical environment.

16. A method of rendering content on a handheld device having a front side and a back side, the method comprising:
tracking the user for creating user-tracking data, wherein the user-tracking data comprises information relating a position and an orientation of a user face relative to the handheld device;
determining a position of the handheld device for creating device-position data, wherein the device-position data comprises information relating to an orientation of the handheld device relative to a physical environment the handheld device is situated;
calculating rendering data using the user-tracking data and the device-position data,
wherein the content is composed of computer-generated content and an image of a physical object in an area of the back side of the handheld device,
wherein the image of the physical object is viewable on the handheld device,
wherein display of the content in 3D is adjusted based on user movement relative to the handheld device and handheld device movement relative to the physical environment the handheld device is situated.

17. The method as recited in claim 16 wherein determining a position of the handheld device for creating device-position data further comprises:
using an imager on the back side of the device to track a position of the physical object relative to the device.

18. The method as recited in claim 17 wherein the handheld device has an opaque display and the imager enables display of the image of the physical object on the opaque display.

19. The method as recited in claim 18 wherein the imager is a camera capable of mechanical panning and tilting.

20. The method as recited in claim 19 wherein the physical object is in a sub-field of view within a maximum field of view of the wide-angle lens camera.

21. The method as recited in claim 17 wherein the imager is a wide-angle lens camera.

22. The method as recited in claim 16 wherein the handheld device has a partially transparent display wherein the physical object is seen on the display by a user seeing through the display.

23. The method as recited in claim 16 further comprising:
compositing the image of the physical object with the computer-generated content.

24. A handheld device having a display, the handheld device comprising:
a CPU;
a first sensor for tracking user face positional movement and creating face-tracking data, wherein the face-tracking data comprises information relating a position and an orientation of a user face relative to the handheld device;
a second sensor for tracking movement of the handheld device and creating device-tracking data, wherein the device-tracking data comprises information relating to an orientation of the handheld device relative to a physical environment the handheld device is situated;
a summation module for combining the face-tracking data and the device-tracking data;
a rendering module for calculating rendering data based on user movement relative to the handheld device and handheld device movement relative to the physical environment the handheld device is situated; and
a data storage component for storing the face-tracking data, the device-tracking data, and the rendering data.

25. The handheld device as recited in claim 24 further comprising:
a virtual camera calculation module for calculating a position of a virtual camera, thereby creating virtual camera position data.

26. The handheld device as recited in claim 25 wherein the rendering module uses the virtual camera position data to calculate the rendering data.

27. The handheld device as recited in claim 25 wherein the rendering module uses the virtual camera position data and physical object images to calculate the rendering data.

28. The handheld device as recited in claim 24 wherein the first sensor is a camera having a conventional field-of-view.

29. The handheld device as recited in claim 24 wherein:
the second sensor is an actuated camera capable of mechanical panning and tilting.

30. The handheld device as recited in claim 29 further comprising:
a panning-control module for adjusting the panning and tilting of the actuated camera.

31. The handheld device as recited in claim 24 wherein the second sensor is a camera having a wide-angle lens.

32. The handheld device as recited in claim 24 wherein the display component is a partially transparent display such that a user can optically see through the display and see physical objects.

33. The handheld device as recited in claim 24 wherein the summation module uses vector addition to combine the face-tracking data and the device-tracking data.

34. A handheld device for rendering computer-generated content in a spatially correct manner, the handheld device comprising:
- means for tracking a user, creating user-tracking data for user movement, wherein the user-tracking data comprises information relating a position and an orientation of a user face relative to the handheld device;
- means for determining a position of the handheld device, creating device-position data for device movement, wherein the device-position data comprises information relating to an orientation of the handheld device relative to a physical environment the handheld device is situated;
- means for calculating rendering data using the user-tracking data and the device-position data; and
- means for displaying the computer-generated content on the handheld device according to the rendering data, wherein rendering of the computer-generated content is adjusted based on user movement relative to the handheld device and handheld device movement relative to the physical environment the handheld device is situated.

35. A handheld device having a front side and a back side and having a display for displaying content, the handheld device comprising:
- means for tracking the user, creating user-tracking data for user movement, wherein the user-tracking data comprises information relating a position and an orientation of a user face relative to the handheld device;
- means for determining a position of the handheld device, creating device-position data for device movement, wherein the device-position data comprises information relating to an orientation of the handheld device relative to a physical environment the handheld device is situated; and
- means for calculating rendering data using the user-tracking data and the device-position data,
- wherein the content is composed of computer-generated content and an image of a physical object in an area of the back side of the handheld device,
- wherein the image of the physical object is viewable on the display of the handheld device, and
- wherein display of the content in 3D is adjusted based on user movement relative to the handheld device and handheld device movement relative to the physical environment the handheld device is situated.

* * * * *